(12) United States Patent
Hovis

(10) Patent No.: US 7,878,415 B2
(45) Date of Patent: Feb. 1, 2011

(54) SEGMENTED CIRCULAR BAR CODE

(75) Inventor: Gregory Hovis, Martinez, GA (US)

(73) Assignee: Direct Measurements Inc., Atlanta, GA (US)

( * ) Notice: Subject to any disclaimer, the term of this patent is extended or adjusted under 35 U.S.C. 154(b) by 243 days.

(21) Appl. No.: 12/285,123

(22) Filed: Sep. 29, 2008

(65) Prior Publication Data

US 2009/0090786 A1 Apr. 9, 2009

(51) Int. Cl.
*G06K 19/06* (2006.01)
*G06K 7/10* (2006.01)

(52) U.S. Cl. .......... 235/494; 235/375; 235/462.01; 235/462.03; 235/462.1

(58) Field of Classification Search .......... 235/375, 235/462.01, 462.03, 494
See application file for complete search history.

(56) References Cited

U.S. PATENT DOCUMENTS

| | | | | |
|---|---|---|---|---|
| 3,409,760 A | * | 11/1968 | Hamisch | 235/494 |
| 5,241,166 A | | 8/1993 | Chandler | |
| 5,260,556 A | * | 11/1993 | Lake et al. | 235/494 |
| 5,477,012 A | * | 12/1995 | Sekendur | 178/18.09 |
| 5,552,593 A | * | 9/1996 | Biss | 235/495 |
| 5,554,841 A | * | 9/1996 | Kost et al. | 235/494 |
| 5,798,514 A | | 8/1998 | Domanik | |
| 5,852,434 A | * | 12/1998 | Sekendur | 345/179 |
| 5,861,613 A | | 1/1999 | Apelberg et al. | |
| 5,969,322 A | * | 10/1999 | Mori et al. | 235/462.01 |
| 7,398,928 B2 | * | 7/2008 | Gaspard et al. | 235/462.03 |
| 2003/0121979 A1 | * | 7/2003 | D'Haens et al. | 235/462.03 |
| 2004/0028258 A1 | * | 2/2004 | Naimark et al. | 382/103 |
| 2005/0269412 A1 | * | 12/2005 | Chiu et al. | 235/462.03 |

OTHER PUBLICATIONS

R. Adams, "Bar Code 1 2-Dimensional Bar Code Page," Adams Communications, Aug. 27, 2003.

* cited by examiner

*Primary Examiner*—Thien M. Le
*Assistant Examiner*—Tuyen K Vo
(74) *Attorney, Agent, or Firm*—Jacobson Holman PLLC

(57) ABSTRACT

A segmented circular bar code is made-up of inner and outer locator rings, one or more data rings, two large orientation cells, an even number of radially-extending gaps dividing the bar code into a corresponding number of segments, and gap locator cells straddling each radially-extending gap. Each of the locator rings and the data rings is circular and has a finite width. All rings are concentric and there is no circumferential space between the rings.

22 Claims, 4 Drawing Sheets

SEGMENTED CIRCULAR BAR CODE

CROSS-REFERENCE TO RELATED APPLICATIONS

The present patent application is related to provisional Application No. 60/564,939, filed Apr. 26, 2004; to International Application No. PCT/US2005/014099, filed Apr. 25, 2005, which claims priority of provisional Application No. 60/564,939; and to U.S. application Ser. No. 11/725,564, filed Mar. 20, 2007, which is a continuation of International Application No. PCT/US2005/014099, all of which are incorporated herein by reference in their entireties.

BACKGROUND OF THE INVENTION

1. Field of the Invention

The present invention relates to high data capacity bar codes for non-linear strain measurement. More specifically, the invention relates to a high-data capacity, segmented circular bar code geometry that utilizes locator rings, orientation cells, and data cells in multiple concentric rings, which can be used for non-linear strain analysis and measurement.

2. Related Art

Bar codes are "machine readable" markings that are used to encode and store information in a normal geometric pattern, or compressed symbol. Possibly the most familiar bar code is the one-dimensional (1 D) pattern of alternating black and white bars found on labels and price tags of nearly every consumer item (commonly referred to as a universal price code or UPC).

The need to store greater amounts of information in a compact symbol gave rise to two-dimensional (or 2 D) bar codes. Early 2 D bar codes were simply multiple rows of 1 D bar codes. Matrix-type codes later evolved with black and white dots or squares arranged in a regular rectangular pattern. Today there are a variety of 2 D bar code patterns. Examples are 3-DI, Aztex, Codablock, Code 1, Code 16K, Code 49, CP Code, DataGlyph, DataMatrix, Datastrip Code, Dot Code A, Hue Code, Intacta Code, MaxiCode, MiniCode, PDF 417, QR Code, SmartCode, Snowflake Code, SuperCode, and UltraCode. Of the 2 D bar codes listed above, only the 3-DI code (described in U.S. Pat. No. 5,554,841 assigned to Lynn Ltd.) is based on a circular geometry. DMI is aware of an additional circular bar code (U.S. Pat. No. 5,798,514) that utilizes lengths of opposing radial "teeth" to encode data.

While a variety of bar code configurations exist today, the inventor and his assignee (Direct Measurement Inc.) have identified a need for a high-data capacity circular bar code with certain geometric properties not presently available in existing bar code configurations.

It is to the solution of these and other problems that the present invention is directed.

SUMMARY OF THE INVENTION

It is accordingly a primary object of the present invention to provide a high-data capacity circular bar code with certain geometric properties not presently available in existing bar code configurations.

It is another object of the present invention to provide a high-data capacity circular bar code that can encode 4 billion plus unique identification numbers. It is still another object of the present invention to provide a strain gage employing a segmented circular bar code as a target.

These and other objects of the invention are achieved by a segmented circular bar code comprising at least one data ring, each data ring comprising a plurality of data cells arranged side-by-side in a circle, inner and outer locator rings, each locator ring being a solid color and conveying the location and size of the bar code to a reading device, a circumferentially-extending locator gap, and two orientation cells conveying the orientation of the bar code to the reading device. The locator rings and the at least one data ring are circular, have a finite radial dimension, are concentric, without any circumferentially-extending gap between adjacent rings, and are divided into an even number of segments by a corresponding number of radially-extending gaps. Each radially-extending gap is positioned between two radially-extending gap-locator cells, which are a solid color and convey the number, location, and size of the radially-extending gaps to the reading device.

In one aspect of the invention, the two orientation cells are arranged on each side of one of the radially-extending gaps, and each has a unique appearance. The orientation cell positioned to the left of the radially-extending gap is a single, solid color, has a radial dimension equal to the combined radial dimensions of all the data rings, an outer circumferential dimension equal to the outer circumferential dimension of a data cell in the outermost data ring, an inner circumferential dimension equal to the inner circumferential dimension of a data cell in the innermost data ring, and is completely surrounded by opposite color cells (that is, it is bordered on all four sides and at the corners by opposite color cells). The orientation cell positioned to the right of the radially-extending gap is a single, solid color, has a radial length equal to the combined radial length of all the data rings, an outer circumferential dimension equal to twice the outer circumferential dimension of a data cell in the outermost data ring, an inner circumferential dimension equal to twice the inner circumferential dimension of a data cell in the innermost data ring, and is partially enclosed by opposite color cells, being bordered on all four sides by opposite color cells, but being bordered at its corners by cells of the same color. The circumferential and radial dimensions of the orientation cells convey the size of the data cells to the reading device.

In another aspect of the invention, the locator gap is a circumferentially-extending gap in the outer locator ring that has a circumferential dimension at least twice that of the radially-extending gaps, has an axis that is co-extensive with a radius of the bar code and the centerline of the radially-extending gap between the two orientation cells, and conveys the approximate orientation of the bar code and approximate location of the two orientation cells to the reading device.

In another aspect of the invention, the bar code can contain two checkered rings that are defined by alternating dark and light cells of equal size. The first checkered ring is located on the inboard side of the outer locator ring, and the second checkered ring is located on the outboard side of the inner locator ring, and the at least one data ring is located between the two checkered rings. The checkered rings convey the angular location of the data cells to the reading device.

In still another aspect of the invention, the circular bar code can have either a positive or a negative color scheme.

Each data cell is a binary storage location. A data cell of the same color as the locator ring has a value of "1" and a data cell of the opposite color as the locator ring has a value of "0."

In still another aspect of the invention, the two locator rings, the two checkered rings, and the at least one data ring together define a symbol area, and the circular bar code further comprises inner and outer quiet regions immediately inside and outside the symbol area for providing background contrast to enable the reading device to properly locate, identify, and read data in the bar code.

In still another aspect of the invention, the capacity of the segmented circular bar code equals (number of data rings)× (number of data cells per ring).

A non-linear strain gage in accordance with the invention comprises a target associated with an object for which at least one of strain and fatigue damage is to be measured, a sensor compatible with a detectable physical quantity emitted by the target for pre-processing the detectable physical quantity and outputting data representing the physical quantity, means for analyzing the data output by the sensor to define the segmented circular bar code, and means for measuring the strain on the object directly based on the pre-processed and analyzed data, wherein the target comprises a segmented circular bar code in accordance with the present invention.

In another aspect of the invention, the non-linear strain gage further comprises means for decoding serial number information stored in the target's data regions.

In still another aspect of the invention, the non-linear strain gage further comprises means for utilizing the strain measurement to provide information on at least one of fatigue damage and strain hysteresis for materials of known and unknown mechanical properties.

In a method of measuring strain on an object directly, in accordance with the present invention, the segmented circular bar code is associated with an object in such a way that deformation of the segmented circular bar code and deformation under load of the object bear a one-to-one relationship, wherein the segmented circular bar code emits a detectable physical quantity. The changes in the segmented circular bar code are identified as a function of time and change in the load applied to the object. The changes in the segmented circular bar code are then translated into one of a direct measurement of strain and fatigue.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
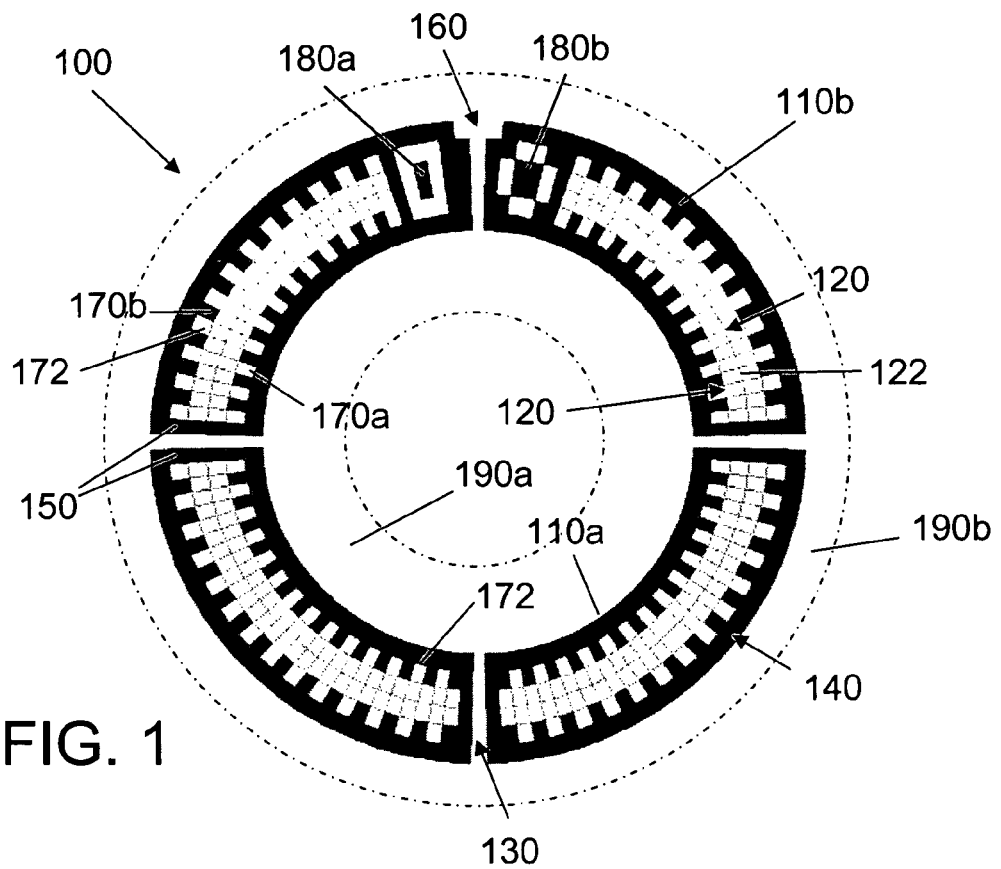
FIG. 1 illustrates a generic example of a segmented circular bar code configuration in accordance with the present invention.
Figure 2:
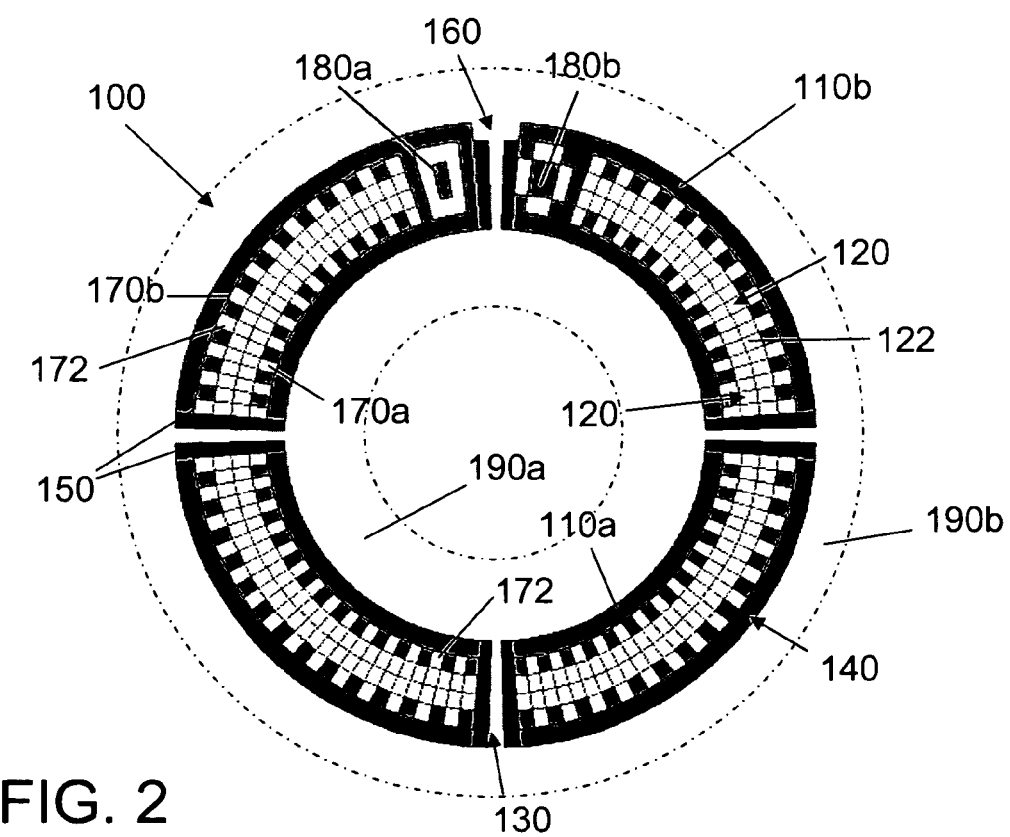
FIG. 2 shows the segmented circular bar code of FIG. 1, in which the gap-locator cells are highlighted for clarity.
Figure 3:
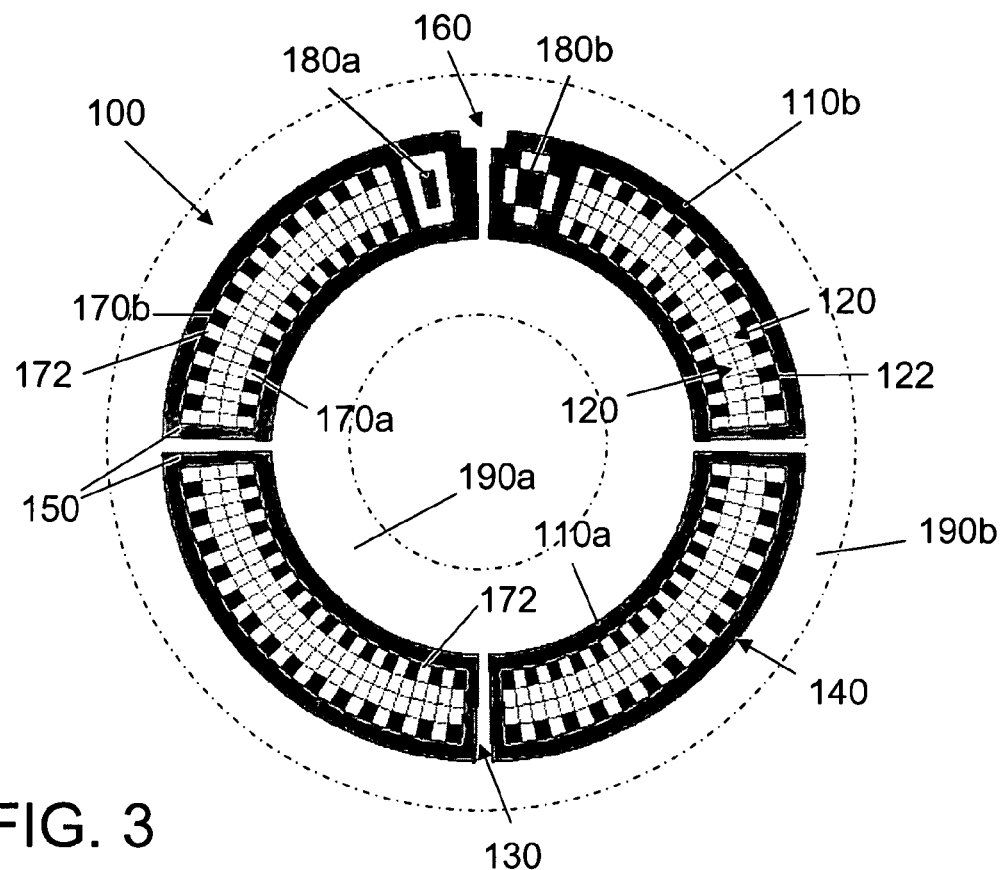
FIG. 3 shows the segmented circular bar code of FIG. 1, in which the checkered, outboard and inboard rings are highlighted for clarity.
Figure 4:
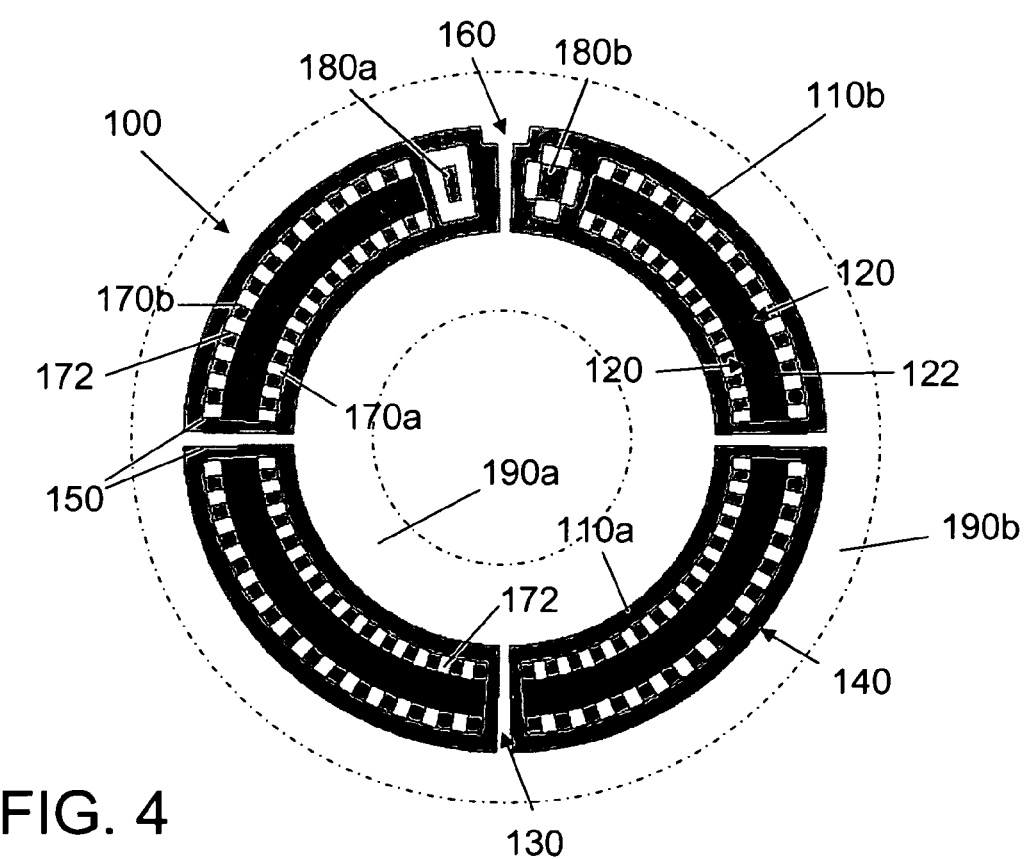
FIG. 4 shows the segmented circular bar code of FIG. 1, in which the data cells are highlighted for clarity.
Figure 5:
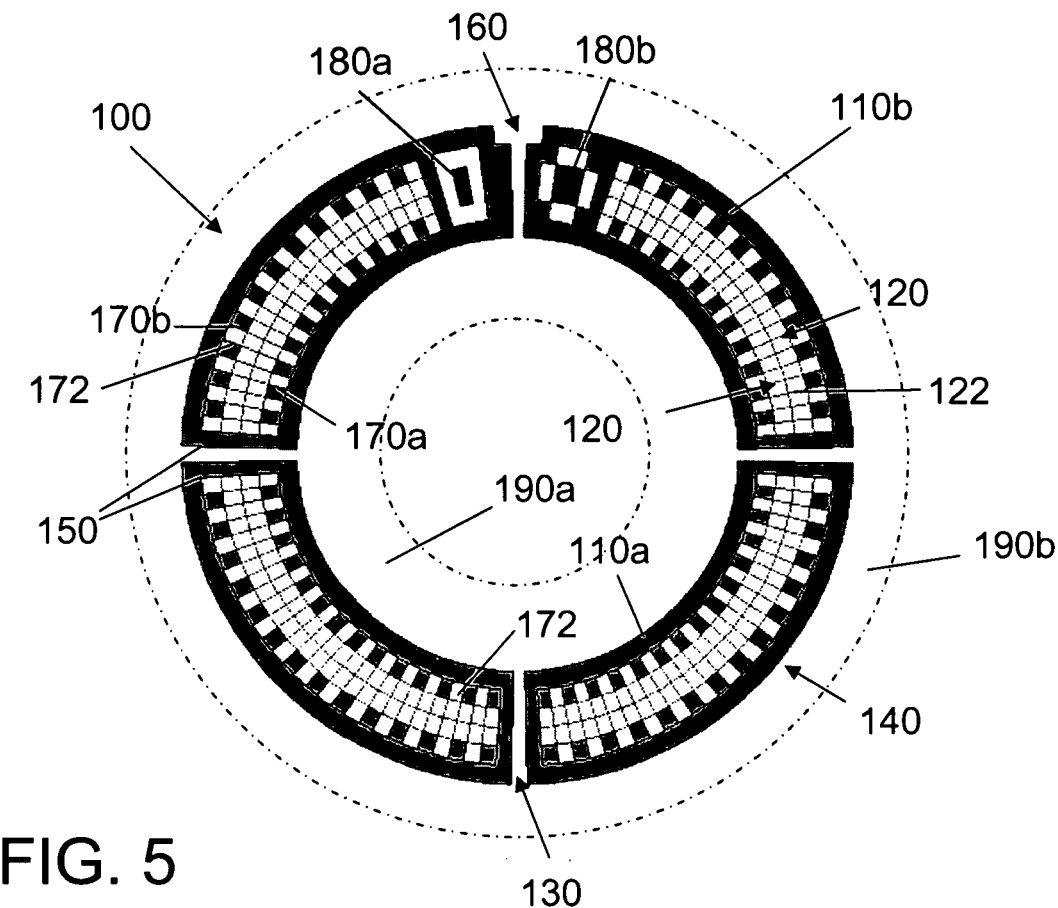
FIG. 5 shows the segmented circular bar code of FIG. 1, in which the orientation cells are highlighted for clarity.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The present invention is directed to a segmented circular bar code, generic examples 100 of which are shown in FIGS. 1-5, a non-linear strain gage 200 (FIG. 7) incorporating the segmented circular bar code 100, and a method of measuring non-linear strain using the strain gage 200.

The segmented circular bar code 100 is made-up of inner and outer locator rings 110$a$ and 110$b$, at least one data ring 120, a plurality of radially-extending gaps 130 dividing the bar code 100 into a corresponding number of segments 140, gap-locator cells 150 demarcating each side of each radially-extending gap 130, a circumferentially-extending locator gap 160 in the outer locator ring 110$b$, outboard and inboard checkered rings 170$a$ and 170$b$, and two orientation cells 180$a$ and 180$b$. Each of the locator rings 110$a$ and 110$b$, the checkered rings 170$a$ and 170$b$, and the data rings 120 is circular and has a finite radial dimension. All of the rings 110$a$, 110$b$, 170$a$, 170$b$, and 120 are concentric, and there is no circumferential gap or space between the rings 110$a$, 110$b$, 170$a$, 170$b$, and 120.

The segmented circular bar code 100 is divided into an even number 2n of segments 140, where n is an integer $\geq 1$, by a corresponding number of radially-extending gaps 130. In the generic example shown in FIGS. 1-5, there are four radially-extending gaps 130 extending through the inner and outer locator rings 110$a$ and 10$b$ and dividing the segmented circular bar code 100 into four segments 140. The purpose of the segments 140 is to provide distinct, separated data regions, which are readable independently or in conjunction with one or more segments of the same bar code.

The data rings 120 comprise side-by-side data cells 122 arranged in a circle. While two data rings 120 are shown in the exemplary segmented circular bar code 100 of FIGS. 1-5, no particular limit on the number of data rings 120 is imposed in the segmented circular bar code in accordance with the present invention, which may have one or more data rings 120.

The inner and outer locator rings 110a and 110b are solid color rings that aid in machine reading by conveying the location and size of the bar code 100 to the reading device. The locator gap 160 is a break in the outer locator ring 110b having a width that is at least twice as wide as the radially-extending gaps 130.

Each data cell 122 is a binary storage location. That is, a data cell 122 has a value of "1" or "0." By definition, a data cell 122 shaded the same color as the locator rings 110a and 110b has a value of "1." A data cell 122 shaded the opposite color of the locator rings 110a and 110b has a value of "0." The data cells can be used to store encoded information, such as a unique identification or serial number. Using simple binary encoding, the segmented circular bar code 100 can store numbers in the range of 0 to $2^n-1$, where n equals the total number of data cells 122 in the bar code 100. The exemplary segmented circular bar code 100 in FIG. 1 contains 102 data cells 122 per data ring 120, and has two data rings, for a total of 204 data cells, meaning when simple binary encoding is used it can store binary encoded numbers in the range of 0 to $2^{104}-1$ (or approximately $2 \times 10^{31}$). Encoding methods that enhance data recovery reduce the range of numbers that can be stored. For example, a Hamming 7-4 error-correction encoding technique utilizes 7 data cells 122 to encode 4 binary values, reducing n in the term $2^n-1$ by approximately 43%. Simple data redundancy may also be employed to enhance data recovery, whereby each half of the total number of data cells 122 is used to encode the same value, reducing the "n" in the term $2^n-1$ by 50%. When both the both the Hamming 7-4 and simple redundancy methods of data recovery are employed in the exemplary segmented circular bar code 100 in FIG. 1 with 204 data cells 122, the bar code 100 can store numbers in the range of 0 to approximately $3 \times 10^{17}$.

The gaps 130 separating the bar code segments 140 take on the characteristic bar code background color (i.e., a light color in the "positive" color scheme and a dark color in the "negative" color scheme). The dimensions of the gaps 130 can vary depending upon the size of the circular bar code 100, the number of data rings 120, and the number of segments 140; but generally, the minimum circumferential dimension of a gap 130 is equal to the circumferential dimension of a data cell 122, and the dimension of a gap 130 in the radial direction is sufficient to completely separate adjacent segments 140.

The gaps 130 always provide visible, or machine readable, contrast between the bar code segments 140. The gaps 130 can also provide a physical separation between the segments 140. That is, if the bar code 100 is affixed to an underlying label material, some or all of the label material in the gaps 130 can be removed (for example, by cutting or by omission during manufacturing) to provide physical separation between the segments 140.

Contrast near the gaps 130 is provided by gap-locator cells 150 on either side of each gap 130. The gap-locator cells 150 are the same color as the locator rings 110a and 110b. All of the gap-locator cells 150 bound the full radial dimension of the gaps 130, with the exception of the gap locator cells 150 bounding the radially-extending gap 130 passing through the locator gap 160; there, the gap locator cells 150 extend only to the inner diameter of the outer locator ring 110b.

The outboard and inboard checkered rings 170a and 170b are defined by alternating dark and light cells 172 arranged in a circle. All the cells 172 in the outboard ring 170a are of equal size, and all the cells 172 in the inboard ring 170b are of equal size; but it will be appreciated that, because of the concentric arrangement of the outboard and inboard checkered rings 170a and 170b, the cells 172 of the outboard ring 170a will be smaller in the circumferential direction than the cells 172 of the inboard ring 170b. The radial dimension of each cell 172 in the outboard and inboard checkered rings 170a and 170b is equal to the radial dimension of a data cell 122. Alternating dark and light cells 172 and data cells 122 are positioned between shared, equally-spaced radii, defining the circumferential dimension of the alternating dark and light cells 172 and the data cells 122.

The outboard checkered ring 170a is immediately adjacent the inner locator ring 110a, radially outboard of the inner locator ring 110a, and the inboard checkered ring 170b is located immediately adjacent the outer locator ring 110b, radially inboard of the outer locator ring 110b. The at least one data ring 120 is concentrically located between the outboard and inboard checkered rings 170a and 170b, which aid in machine reading by conveying the angular position of the data cells 122 in the data rings 120 to the reading device.

FIGS. 1-5 show left and right orientation cells 180a and 180b arranged on the left and right, respectively, of one of the radially-extending gaps 130. Each of the orientation cells 180a and 180b has a unique appearance. The left orientation cell 180a (that is, the orientation cell 180a counter-clockwise relative to its associated radially-extending gap 130) is a single solid color, has a radial dimension equal to the combined radial dimensions of all the data rings 120, an outer circumferential dimension equal to the outer circumferential dimension of a data cell 122 in the outermost data ring 120, an inner circumferential dimension equal to the inner circumferential dimension of a data cell 122 in the innermost data ring 120 and is completely surrounded by opposite color cells (that is, it is bordered on all four sides and at the corners by opposite color cells). The right orientation cell 180b (that is, the orientation cell 180b clockwise relative to its associated radially-extending gap 130) is a single solid color, has a dimension in the radial direction equal to the combined dimensions in the radial direction of all the data rings 120, an outer circumferential dimension equal to twice the outer circumferential dimension of a data cell 122 in the outermost data ring 120, an inner circumferential dimension equal to twice the inner circumferential dimension of a data cell 122 in the innermost data ring 120, and is partially enclosed by opposite color cells being located adjacent to the orientation cell's 180b solid color cell's sides, being bordered on all four sides by opposite color cells, but being bordered at its corners by cells of the same color.

The circumferential and radial dimensions of the orientation cells 180a and 180b convey the data ring 120 size and data cell 122 size to the reading device. The orientation cells 180a and 180b serve two primary purposes with respect to bar code 100 orientation: (1) they are easily recognized by human observation for bar code orientation purposes, and (2) they are consistent, recognizable patterns for improving performance of machine (or reader) orientation algorithms.

The locator gap 160 is positioned along a radial line that extends through the radially-extending gap 130 between the orientation cells 180a and 180b. The locator gap 160 conveys to the reading device the approximate orientation of the bar code 100 and approximate location of the two orientation cells 180a and 180b.

The total storage capacity of a segmented circular bar code depends upon the number of data rings 120, and the number of data cells 122 per data ring. The example in FIGS. 1-5 has two data rings 120 per segment 140. The segments 140 that contain the orientation cells 180a and 180b typically contain fewer data cells 122 per data ring 120 as the orientation cells 180*a* and 180*b* consume finite area within a segment 140. In the example in FIG. 1, the segments 140 containing the orientation cells 180*a* and 180*b* have data rings 120 with 23 data cells 122 per data ring 120, totaling 46 data cells 122 per segment 140. The two segments 140 that do not contain the orientation cells 180*a* and 180*b* have data rings 120 containing 28 data cells 122 per data ring 120, totaling 56 data cells 122 per segment 140 In general, the storage capacity of a bar code segment 140 is computed as follows:

Segment Capacity=(number of data rings)×(number of data cells per ring)  Eq. (1)

The total storage capacity of a segmented circular bar code 100 is the sum of the capacities of all the segments 140.

Inner and outer "quiet regions" are defined as circular regions 190*a* and 190*b*, respectively, immediately adjacent to the inner and outer circumferences of the bar code 100 (i.e. immediately inside and outside of the inner and outer locator rings 110*a* and 110*b*). These quiet regions 190*a* and 190*b* assist in machine reading by providing the necessary background contrast to properly locate, identify, and read bar code data. It is noted that in the FIGURES, broken lines are used to show the boundaries of the quiet regions 190*a* and 190*b*, but that in practice, the bar codes 100 do not actually include these broken lines.

Segmented circular bar codes 100 in accordance with the present invention can be formed in "positive" or "negative" color schemes. In a positive color scheme, the locator rings 110*a* and 110*b* are shaded dark, data cells 122 with value "1" are shaded dark, data cells 122 with value "0" are shaded light, while the quiet regions are either shaded light or have a naturally light appearance. The opposite of these rules is true of negative color schemes.

Deformation analysis can provide a detailed accounting of the spatial characteristics of the bar code 100 under various conditions. For instance, deformation analysis can mathematically describe geometric changes from some reference state to some subsequent state (e.g. a change in size, shape, symmetry, etc.).

Strain measurement is one useful product of deformation analysis. Strain is a unitless mechanical property defined as a change in length per unit length. In a method of measuring strain in accordance with the present invention, the segmented circular bar code 100 is associated with a body that is to be subjected to a force. During the deformation, there are changes in the length of the radii of the circle. The fundamentals of this deformation are well-known to those of skill in the art, and are explained in classical texts on mechanics of elasticity. These fundamentals define strain in terms of a closed solution. Thus, the method in accordance with the present invention relates observed deformation to the closed form solution. Change in length is observed, and the ratio of change in length to the original length is used to measure strain due to a force on the body with which the segmented circular bar code 100 is associated. More specifically, deformation analysis of the segmented circular bar code 100 yields strain components at any distinguishable feature of the bar code 100.

Figure 6:
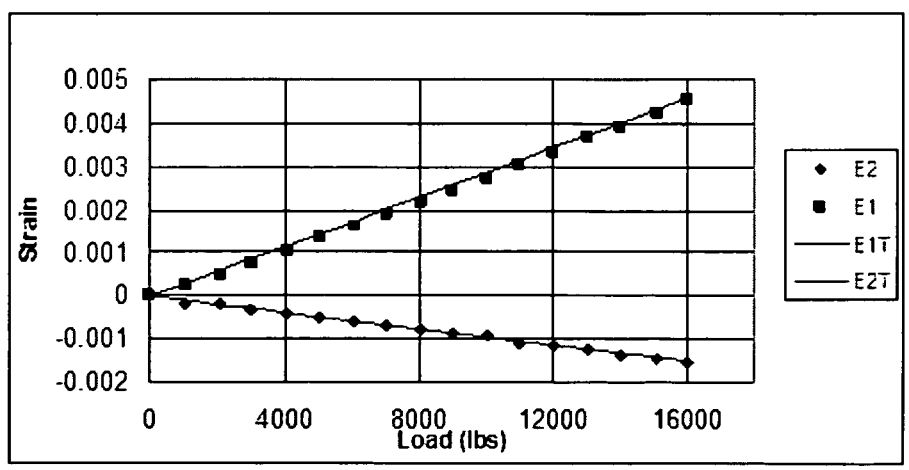
FIG. 6 is a graph of strain data obtained using the closed form solution and of experimental data obtained using a strain gage in accordance with the present invention.

The graph of FIG. 6 shows strain data for the closed form solution (represented by solid lines) and for experimental data (represented by square and diamond shaped symbols) using a strain gage in accordance with the present invention on a test coupon. In FIG. 6, data labeled E1 is strain measured in the direction of the applied loads, and data labeled E2 is strain measured in the direction transverse to applied loads. Lines E1T and E2T represent the "theoretical" or closed form solution for strains in the load direction and transverse direction, and are shown on the graph for comparison with data measured using a strain gage 200 in accordance with the present invention, as described hereinafter.

Figure 7:
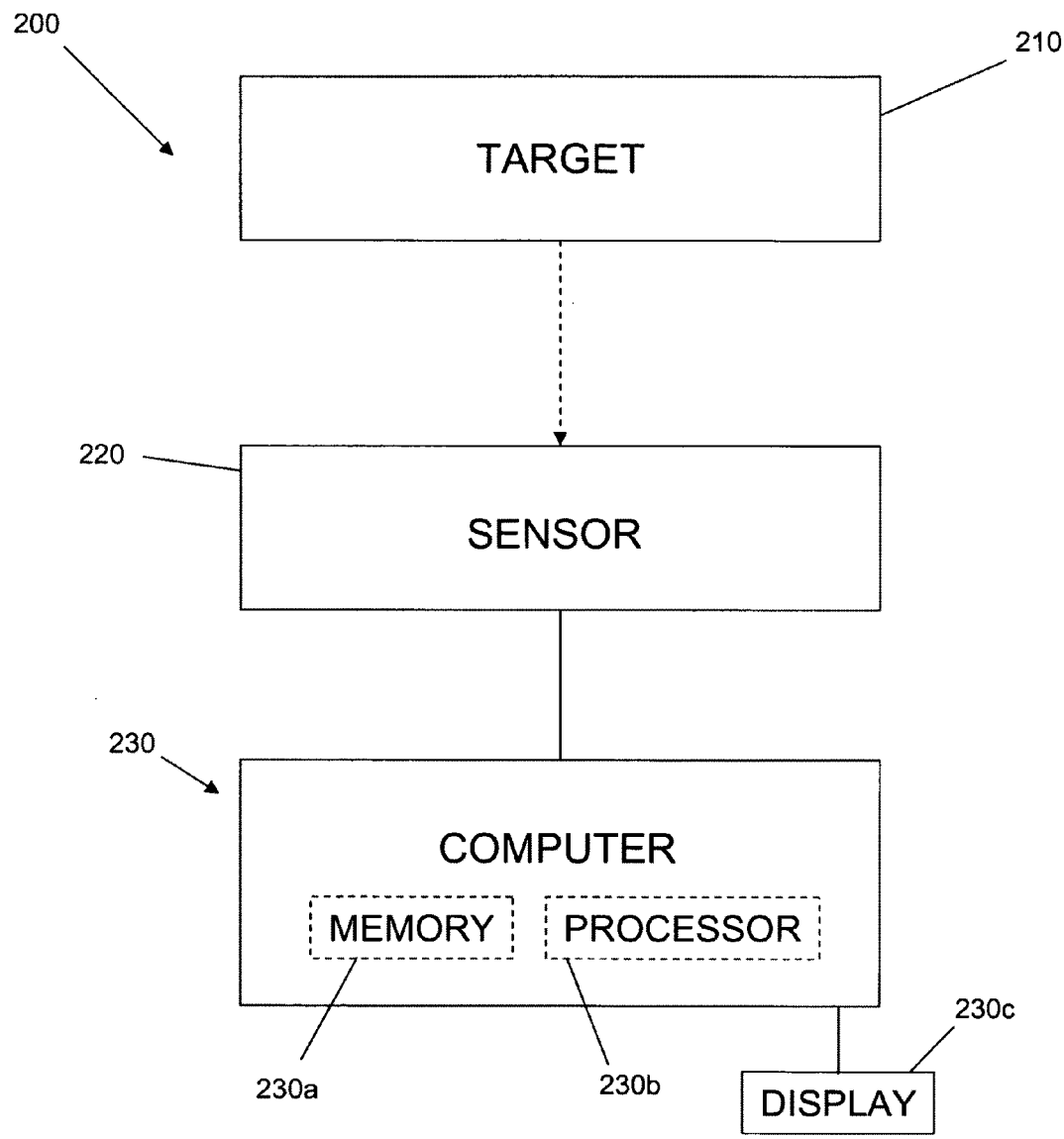
FIG. 7 is a diagrammatic view of a non-linear strain gage in accordance with the present invention.

Referring now to FIG. 7, there is shown diagrammatically a non-linear strain gage 200 for measuring the strain on an object under load in accordance with the present invention, comprising a target 210, a sensor 220, and a computer 230, wherein the target 210 is a segmented circular bar code 100 in accordance with the present invention.

The target 210 can be associated with an object by any means such that deformation of the object results in deformation of the segmented circular bar code 100. The target 210 can be associated with an object for which strain is to be measured by applying it directly or indirectly to the surface of the object, or by embedding it in the objection.

Examples of application of a target 210 include, but are not limited to:

(1) Application to a medium such as a polyimide film that is bonded, for example by gluing, to the surface of the object for which strain is to be measured (indirect application);
 (2) Etching on a surface (direct application);
 (3) Painting on surface (direct application);
 (4) Printing on a surface (direct application); and
 (5) Laser bonding in accordance with NASA STD 6002 and Handbook 6003 (direct application).

Examples of embedding of a target 210 include, but are not limited to:

(1) Embedding in the object to be studied when the object is being formed;
 (2) Covering with an overlying material, such as one or more layers of paint; and
 (3) Implanting in a body, in a body part or an implant. For example, if the target 210 is affixed to a critical area of a hip joint or a hip implant, or to an artificial heart valve, the target 210 can be viewed through the tissue surrounding the target 210 by an x-ray sensor 220, and the strain and fatigue damage to the associated body part or implant can be assessed over time.

The target 210 can naturally emit a detectable physical quantity, create a detectable physical quantity, or reflect a detectable physical quantity. The detectable physical quantity can be a signal in any portion of the electromagnetic spectrum (including the audio frequency range), or it can be a field such as a magnetic field. The detectable physical quantity can be a signal that can be characterized as a gray-scale or color image that can be converted into an image file format. Sensors that will sense various detectable physical quantities, including all these signals and fields, are commercially available.

The target 210 is scalable, in that it can be produced and sensed on a scale ranging from microscopic to macroscopic. Thus, the non-linear strain gage 200 in accordance with the present invention is applicable to very large applications such as viewing a target 210 on earth from space to determine displacements/strain of the earth's surface or subsurface strains. All that is required is to match the sensor 220 to the scale or scope of the target and the detectable physical quantity emitted by the target 210.

One advantage of the non-linear strain gage 200 is that strain is measured directly, as opposed to being inferred from secondary measurements using analog techniques. Strain is measured near any distinguishable feature of the target 210, and the non-linear strain gage 200 provides measurements of normal and shear strain components and/or radial and tangential strain components.

Another advantage of the non-linear strain gage 200 is that the range of strain measurements is easily from 0 to at least 150%, which permits measurements of strain in elastic materials such as rubber and plastic. The non-linear strain gage 200 also covers measurements at the nanoscale level.

Another, and major advantage of the non-linear strain gage 200 is that strain differentials within the gage area can be detected.

Still another, and major advantage of the non-linear strain gage 200 is that subsurface strains can be measured. Subsurface measurements provide valuable information for most materials and can have special applications in man-made composites.

The non-linear strain gage 200 also can be used in the assessment of fatigue damage (accumulation) in critical areas of structures or components of devices subjected to cyclic or other loadings. This is accomplished by observing the area of a component under study over a selected period of time during the normal usage of the area. The data can then be used to assist in component lifecycle management.

The sensor 220 observes the deformation of a target 210 affixed to a surface or embedded in a material by capturing a discrete-element representation (e.g. a digital image) of the total target 210 and transmitting part or all of it to the computer 230. The sensor 220 is selected to be compatible with the detectable physical quantity emitted by the target 210 and undertakes some pre-processing of the observed physical quantity to provide data representing the physical quantity to the computer 230. In the case of a segmented circular bar code 100 that can be monitored optically, the input signal to the sensor 220 may be a grayscale image that can be converted into a bitmap file, although other inputs can be accommodated.

The computer 230 conventionally comprises memory 230a for storing programs and data and a processor 230b for implementing the programs and processing the data, and is associated with a display 230c for displaying data. As the object under study is submitted to loading resulting in strain, the computer 230 implements programs that (1) recognize the segmented circular bar code 100 and the changes therein as a function of time and change in the load, (2) translate the changes in the segmented circular bar code 100 into strain, and (3) display it in a suitable format. The display of the data can take place in real time. The technology is scalable with respect to the size of the object under study.

The segmented circular bar code 100 is monitored—by optical, magnetic, electromagnetic, acoustic, or other sensor 220 type, as appropriate—at successive periods of time, either on a continuous time, at random times triggered by an external event, or on a programmed time basis. Analysis algorithms on the computer 230 utilize data from the sensor 220 to correlate sub-regions of the segmented circular bar code 100 over time to detect the relative movement or deformation of sub-region features, and the movements are quantified and utilized in analytical expressions, or strain equations, to determine strain in the directions of the coordinate system used corresponding to the plane of the surface under study.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A segmented circular bar code, comprising:
    inner and outer locator rings, each locator ring being a solid color and conveying the location and size of the bar code to a reading device;
    outboard and inboard checkered rings, the outboard checkered ring being immediately adjacent the inner locator ring, radially outboard of the inner locator ring, and the inboard checkered ring being located immediately adjacent the outer locator ring, radially inboard of the outer locator ring;
    at least one data ring concentrically located between the outboard and inboard checkered rings, wherein the at least one data ring comprises side-by-side data cells arranged in a circle, wherein each data cell is a binary storage location having a value of "1" or "0," a data cell having the same color as the inner and outer locator rings having a value of "1" and a data cell having an opposite color as the inner and outer locator rings having a value of "0," the data cells being usable to store encoded information, and wherein the outboard and inboard checkered rings convey the angular position of the data cells in the data rings to the reading device;
    an even number of radially-extending gaps dividing the bar code into a corresponding number of segments;
    gap locator cells demarcating each side of each radially-extending gap;
    left and right orientation cells arranged on the left and right, respectively, of one of the radially-extending gaps;
    a circumferentially-extending locator gap in the outer locator ring, the locator gap having an axis co-extensive with a radial line extending through the radially-extending gap between the left and right orientation cells, for conveying to the reading device the approximate orientation of the bar code and approximate location of the left and right orientation cells; and
    quiet regions immediately inside and outside of the inner and outer locator rings, for providing background contrast to enable location, identification, and reading of encoded data by the reading device;
    wherein all of the inner and outer locator rings, the outboard and inboard checkered rings, and the at least one data ring are circular have a finite radial dimension, and are concentric.

2. The segmented circular bar code of claim 1, wherein there is no circumferential space between the inner and outer locator rings, the outboard and inboard checkered rings, and the at least one data ring.

3. The segmented circular bar code of claim 1, wherein the segments provide distinct, separated data regions, wherein each segment is readable both independently and in conjunction with at least one other segment of the bar code.

4. The segmented circular bar code of claim 1, wherein the inner and outer locator rings are solid in color and convey the location and size of the bar code to the reading device.

5. The segmented circular bar code of claim 1, wherein the locator gap is a break in the outer locator ring having a circumferential dimension at least twice that of the radially-extending gaps.

6. The segmented circular bar code of claim 1, wherein the radially-extending gaps take on the bar code background color.

7. The segmented circular bar code of claim 1, wherein the dimensions of the radially-extending gaps depend upon the size of the circular bar code, the number of data rings, and the number of segments.

8. The segmented circular bar code of claim 7, wherein the minimum circumferential dimension of the radially-extending gaps is equal to the circumferential dimension of a data cell, and the dimension of the radially-extending gaps in the radial direction is sufficient to completely separate adjacent segments.

9. The segmented circular bar code of claim 1, wherein the radially-extending gaps provide at least one of a visible contrast and a physical separation between the bar code segments.

10. The segmented circular bar code of claim 1, wherein the gap locator cells are the same color as the inner and outer locator rings.

11. The segmented circular bar code of claim 1, wherein the gap locator cells bounding the radially-extending gap passing through the locator gap extend only to the inner diameter of the outer locator ring, and wherein the other gap locator cells bound the full radial dimension of the radially-extending gaps.

12. The segmented circular bar code of claim 1, wherein the outboard and inboard checkered rings are defined by alternating dark and light cells arranged in a circle.

13. The segmented circular bar code of claim 12, wherein all the cells in the outboard checkered ring are of equal size, and all the cells in the inboard checkered ring are of equal size.

14. The segmented circular bar code of claim 1, wherein each of the left and right orientation cells has a unique appearance.

15. The segmented circular bar code of claim 14, wherein the left orientation cell is a single solid color, has a dimension in the radial direction equal to the combined dimensions in the radial dimension of all the data rings, an outer circumferential dimension equal to the outer circumferential dimension of a data cell in the outermost data ring, an inner circumferential dimension equal to the inner circumferential dimension of a data cell in the innermost data ring, and is bordered on all sides and corners by opposite color cells; and wherein the right orientation cell is a single solid color, has a dimension in the radial direction equal to the combined dimensions in the radial direction of all the data rings, an outer circumferential dimension equal to twice the outer circumferential dimension of a data cell in the outermost data ring, an inner circumferential dimension equal to twice the inner circumferential dimension of a data cell in the innermost data ring, and is bordered on the sides by opposite color cells and at the corners by cells of the same color.

16. The segmented circular bar code of claim 1, wherein the circumferential and radial dimensions of the left and right orientation cells convey the size of the data ring and the data cells to the reading device.

17. The segmented circular bar code of claim 1, wherein the left and right orientation cells are easily recognizable by human observation for bar code orientation purposes, and are consistent, recognizable patterns for improving performance of orientation algorithms.

18. The segmented circular bar code of claim 1, wherein the total storage capability of the segmented circular bar code is the sum of the capacities of all the segments, where Segment Capacity =(number of data rings)×(number of data cells per ring).

19. The segmented circular bar code of claim 1, wherein the encoded information stored in the data cells is a unique identification number.

20. Apparatus for measuring strain on an object under load, comprising:
   a segmented circular bar code in accordance with claim 1, the segmented circular bar code defining a target and being associated with an object under load for which strain is to be measured, the target being associated with the object such that deformation of the target and the object bear a one-to-one relationship;
   sensor means for capturing a physical quantity emitted by the target, for pre-processing the captured physical quantity emitted by the target, to provide data representing the physical quantity, and for outputting data representing the pre-processed captured physical quantity emitted by the target, wherein the physical quantity represents strain components near any distinguishable feature of the target;
   processor means for analyzing the data output by the sensor to identify changes in the segmented circular bar code as a function of time and change in the load applied to the object, based on the data output by the sensor means and for measuring the strain on the object directly based on the analyzed data; and
   means for displaying the results of the strain measurement.

21. A segmented circular bar code comprising:
   means for conveying to a reading device the location and size of the bar code;
   means for storing encoded information, the means for storing encoded information having size and angular position:
   means for dividing the bar code into an even number of data segments;
   means for conveying to the reading device the orientation of the bar code and the size of the means for storing encoded information;
   means for conveying to the reading device the approximate location of the means for conveying the orientation;
   means for conveying to the reading device the size of the means for storing encoded information;
   means for conveying to the reading device the angular position of the means for storing encoded information; and
   means for providing background contrast for the bar code.

22. A method of measuring at least one of strain and fatigue damage on an object directly, using the apparatus of claim 20, comprising the steps of:
   associating the segmented circular bar code with an object in such a way that deformation of the segmented circular bar code and deformation under load of the object bear a one-to-one relationship
   identifying the changes in the segmented circular bar code as a function of time and change in the load applied to the object; and
   translating the changes in the segmented circular bar code into at least one of strain and fatigue damage.

* * * * *